US012754786B2

(12) United States Patent
Singh et al.

(10) Patent No.: US 12,754,786 B2
(45) **Date of Patent: *Oct. 6, 2026**

(54) GRAPHICS RENDERING OPTIMIZATION CLIENT FOR THIN CLIENT APPLICATIONS

(71) Applicant: Hexagon Technology Center GmbH, Heerbrugg (CH)

(72) Inventors: Anupreet Singh, Madison, AL (US); Derek Brown, Athens, AL (US)

(73) Assignee: Hexagon Technology Center GmbH, Heerbrugg (CH)

( * ) Notice: Subject to any disclaimer, the term of this patent is extended or adjusted under 35 U.S.C. 154(b) by 560 days.

This patent is subject to a terminal disclaimer.

(21) Appl. No.: 18/237,724

(22) Filed: Aug. 24, 2023

(65) Prior Publication Data

US 2025/0068493 A1 Feb. 27, 2025

(51) Int. Cl.
*G06F 9/54* (2006.01)

(52) U.S. Cl.
CPC ........ *G06F 9/547* (2013.01); *G06F 2209/541* (2013.01)

(58) Field of Classification Search
CPC ............... G06T 15/005; G06T 2200/16; G06T 2210/36; G06T 15/02; G06F 16/9577; G06F 2209/541; G06F 30/27; G06F 9/547; G09G 2340/02; G09G 2350/00; G09G 2370/022
See application file for complete search history.

(56) References Cited

U.S. PATENT DOCUMENTS

| | | | |
|---|---|---|---|
| 10,062,181 | B1 | 8/2018 | Longhurst et al. |
| 2017/0308656 | A1 | 10/2017 | Petkov et al. |
| 2018/0293697 | A1 | 10/2018 | Ray et al. |
| 2019/0164518 | A1 | 5/2019 | Dimitrov |
| 2019/0213775 | A1 | 7/2019 | Dimitrov et al. |
| 2023/0041844 | A1 | 2/2023 | Feng et al. |

(Continued)

OTHER PUBLICATIONS

International Search Report and the Written Opinion of the International Searching Authority for Application No. PCT/US2024/034358, mailed Oct. 10, 2024 (19 pages).

(Continued)

*Primary Examiner* — Hau H Nguyen
(74) *Attorney, Agent, or Firm* — Nutter McClennen & Fish LLP

(57) ABSTRACT

Systems and methods to automatically provide graphics rendering optimization settings in real-time to a client device for rendering of graphics by a client application such as running on a browser or hand-held device. Specifically, a specially-configured Graphics Rendering Optimization Client application running on a client device sends requests to a corresponding Graphics Rendering Optimization Service running on a server system to obtain graphics rendering settings in real-time for rendering of graphics by the client application running on the client device, thereby providing automated and real-time graphics rendering optimization with little impact on the performance of the client application and client device. In certain embodiments, the Graphics Rendering Optimization Service employs an AI-based model that is trained and used to predict the graphics rendering settings in real time to improve the rendering performance.

21 Claims, 5 Drawing Sheets

(56) References Cited

U.S. PATENT DOCUMENTS

| | | | | |
|---|---|---|---|---|
| 2024/0272917 | A1* | 8/2024 | Mishra | G06F 8/38 |
| 2025/0069316 | A1 | 2/2025 | Singh et al. | |

OTHER PUBLICATIONS

Li, Q., et al., "A Statistics Based Prediction Method for Rendering Application", Sep. 30, 2016 (Sep. 30, 2016), SAT 2015 18th International Conference, Austin, TX, USA, Sep. 24-27, 2015; [Lecture Notes in Computer Science; Lect.Notes Computer], Springer, Berlin, Heidelberg, pp. 73-84, XP047359950, ISBN: 978-3-540-74549-5 [retrieved on Sep. 30, 2016] abstract figure 1 p. 75-p. 76 (12 pages).

United States Patent and Trademark Office, Non-Final Office Action for U.S. Appl. No. 18/237,699, mailed Apr. 23, 2025 (9 pages).

* cited by examiner

GRAPHICS RENDERING OPTIMIZATION CLIENT FOR THIN CLIENT APPLICATIONS

CROSS-REFERENCE TO RELATED APPLICATION(S)

This patent application is related to U.S. patent application Ser. No. 18/237,699 entitled GRAPHICS RENDERING OPTIMIZATION SERVICE FOR THIN CLIENT APPLICATIONS filed on Aug. 24, 2023, which is hereby incorporated herein by reference in its entirety.

The subject matter of this patent application may be related to the subject matter of U.S. patent application Ser. No. 18/197,897 entitled PRECISION GEOMETRY SERVICE FOR THIN CLIENT APPLICATIONS filed on May 16, 2023 and U.S. patent application Ser. No. 18/197,929 entitled PRECISION GEOMETRY CLIENT FOR THIN CLIENT APPLICATIONS filed on May 16, 2023, each of which is hereby incorporated herein by reference in its entirety.

FIELD OF THE INVENTION

The invention generally relates to systems and methods to get and apply optimal rendering settings for display of graphic objects on a thin client application such as running on a browser or hand-held device.

BACKGROUND OF THE INVENTION

Modern client applications displaying 3D Graphics can optimize the use of resources on the client and get best performance by employing various rendering techniques. Some of the techniques are:

- Multiple HTTP Threads to download data from a remote server.
- Multiple threads to tesselate geometry.
- Level of Detail (LOD) schedules such as to do the following:
  - Avoid tessellating and showing smaller objects in the display to reduce CPU and GPU Usage.
  - Tessellate certain objects with coarser facets to reduce CPU and GPU usage.
- Controlling Graphics Processing Unit (GPU) maximum memory usage to optimize GPU usage.

However, usage of these techniques depends on many factors like model size and graphics density, available network resources (e.g., bandwidth, latency, jitter, packet loss), and client resources (e.g., CPU and GPU). Many solutions have been tried in the past to predict the correct values for these optimization techniques. For example, attempts have been made to consider the client resources alone. Also, some graphics software will render graphics with lower visual quality if the network bandwidth is limited. Some will also incorporate the client GPU resources into this determination. Some graphics software will allow users to adjust the Level of Details (LOD) schedule quality manually where user can consider model size and density and adjust these settings manually. However, with complex inter-dependencies between the variables, a good universal solution is not available to optimize these settings in real time.

SUMMARY OF VARIOUS EMBODIMENTS

In accordance with one embodiment, a graphics rendering optimization system, method, and computer program product implements a graphics rendering optimization client configured to perform processes comprising transmitting a client request for graphics rendering settings to a graphics rendering optimization server via an application program interface, the client request including model size data, graphics density data, client resources data, and client graphics rendering settings; receiving, from the graphics rendering optimization server, via the application program interface, a message containing values for the client graphics rendering settings produced by the graphics rendering optimization server using a trained AI/ML model; and rendering graphics by the client device based on the values.

In various alternative embodiments, the application program interface may be a REST application program interface. The client request may be an HTTP request. The message may be a JSON message. The values for the client graphics rendering settings may include at least one of LOD schedule, HTTPThreadCount, GPU Max, or worker thread/pthread count. The client request may further comprise network resources data. The graphics rendering optimization client may be configured to run in a thin client application.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Definitions. As used in this description and the accompanying claims, the following terms shall have the meanings indicated, unless the context otherwise requires.

A "set" includes one or more members, even if the set description is presented in the plural (e.g., a set of Xs can include one or more X).

A "thin client application" in the context of described embodiments is an application that runs on a client device based on data provided by a centralized server in a manner that generally offloads production of the data from the client to the server.

Certain embodiments are directed to systems and methods to automatically provide graphics rendering optimization settings in real-time to a client device for rendering of graphics by a client application such as running on a browser or hand-held device. Specifically, a specially-configured client application running on a client device, referred to herein as a Graphics Rendering Optimization Client (GROC), sends requests to a corresponding Graphics Rendering Optimization Service (GROS) running on a server system to obtain graphics rendering settings in real-time for rendering of graphics by the client application running on the client device, thereby providing automated and real-time graphics rendering optimization with little impact on the performance of the client application and client device. In certain embodiments, the GROS employs an AI-based model that is trained and used to predict the graphics rendering settings in real time to improve the rendering performance.

Figure 1:
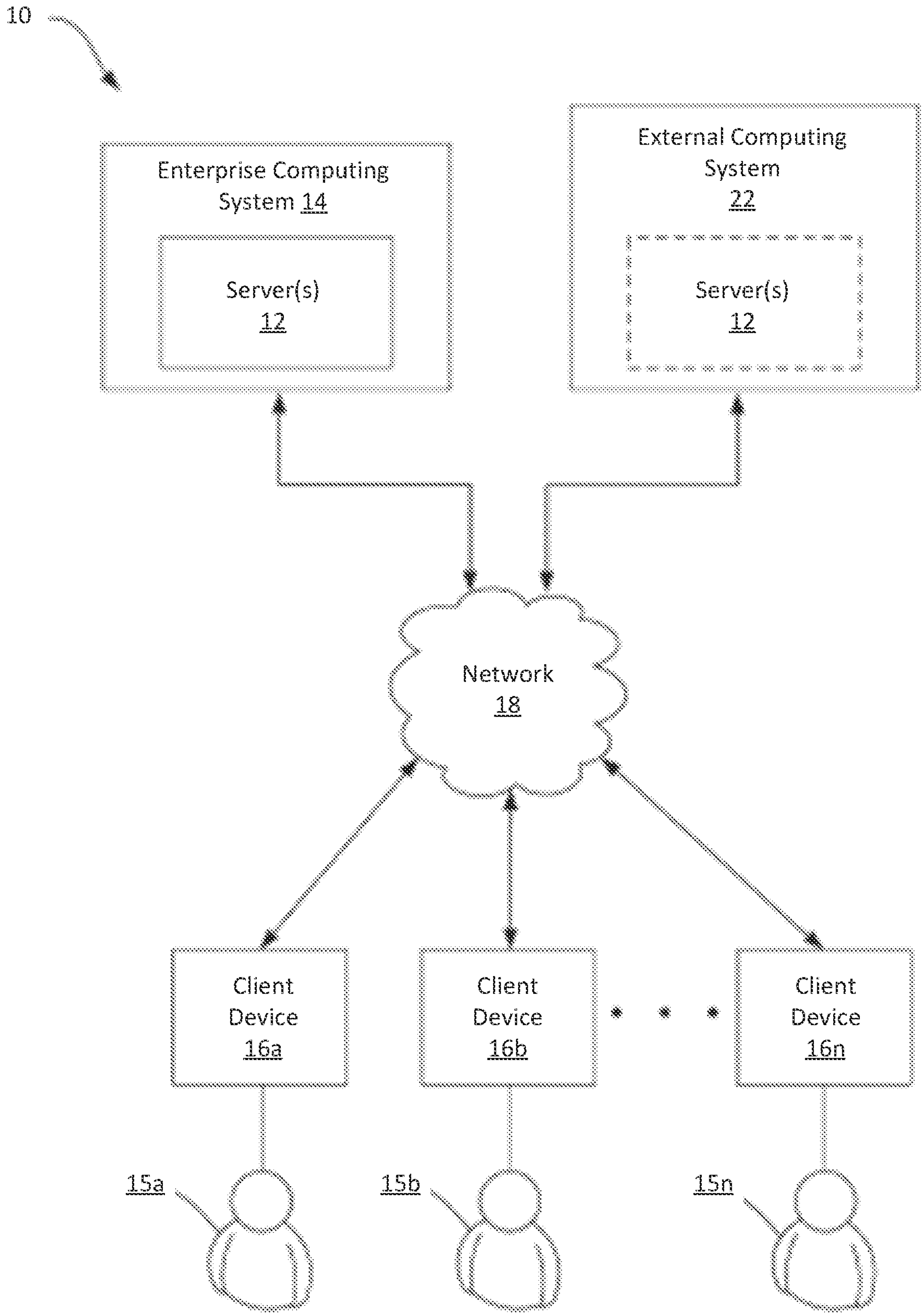
FIG. 1 is a schematic diagram illustrating one embodiment of an exemplary system consistent with the present disclosure.

FIG. 1 illustrates one embodiment of an exemplary system 10 consistent with the present disclosure. As shown, the system 10 includes one or more servers 12 that, for example, may run on an enterprise computing system 14 and/or an external computing system 22 (e.g., a cloud-based computing system). For convenience, the one or more servers 12 running on one or more computing systems 14, 22 can be referred to collectively as a server system 12. It should be noted that the term "server" is used herein broadly to mean any computing device or system that can perform the types of operations discussed herein and is not limited, for example, to a physical or virtual server computer.

The system 10 also includes one or more client computing devices 16(*a*)-16(*n*), which, for convenience, may be referred to herein individually as a client device 16 or collectively as client devices 16. Each client device 16(*a*)-16(*n*) is generally associated with a corresponding user 15(*a*)-15(*n*), who, for convenience, may be referred to herein individually as a user 15 or collectively as users 15, although it should be noted that certain client devices 16 may be unrelated to a specific user 15 (e.g., a client device 16 may operate autonomously or may be associated with a non-user entity such as a company, vehicle, etc.). In the present context, the users 15 may include administrators, customers, developers, or clients of a service provided by the server system 12. The users 15 may also include particular persons to which the service is directed.

The server system 12 is configured to communicate and share data with one or more user client devices 16 over a network 18, and, conversely, the client devices 16 are configured to communicate and share data with the server system 12 via the network 18, which can include data entered by users 15, data from any of various applications running on the client devices 16, and data generated by the client devices 16 themselves (e.g., location/GPS data). In addition, or alternatively, the client devices 16 may be configured to communicate with one another via the network 18 and/or other network (e.g., a particular client device may communicate with the server system 12 via the network 18 but communicate with another client device via a different network).

The network 18 may be or include any network that carries data. Non-limiting examples of suitable networks that may be used in whole or in part as network 18 include a private or non-private local area network (LAN), personal area network (PAN), storage area network (SAN), backbone network, global area network (GAN), wide area network (WAN), metropolitan area network (MAN), virtual private networks (VPN), or collection of any such communication networks such as an intranet, extranet or the Internet (i.e., a global system of interconnected networks upon which various applications or service run including, for example, the World Wide Web). The user mobile devices 16 generally communicate with the server system 12 over a wireless communication system that can include any suitable wireless communication technology. Non-limiting examples of suitable wireless communication technologies include various cellular-based data communication technologies (e.g., 2G, 3G, 4G, LTE, 5G, GSM, etc.), Wi-Fi wireless data communication, wireless LAN communication technology (e.g., 802.11), Bluetooth wireless data communication, Near Field Communication (NFC) wireless communication, other networks or protocols capable of carrying data, and combinations thereof. In some embodiments, network 18 is chosen from the internet, at least one wireless network, at least one cellular communication network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

The server system 12 is configured to communicate and share data with the client devices 16 associated with one or more users 15. Accordingly, the client device 16 may be embodied as any type of device for communicating with the server system 12 and/or other client devices over the network 18. For example, at least one of the client devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

Figure 2:
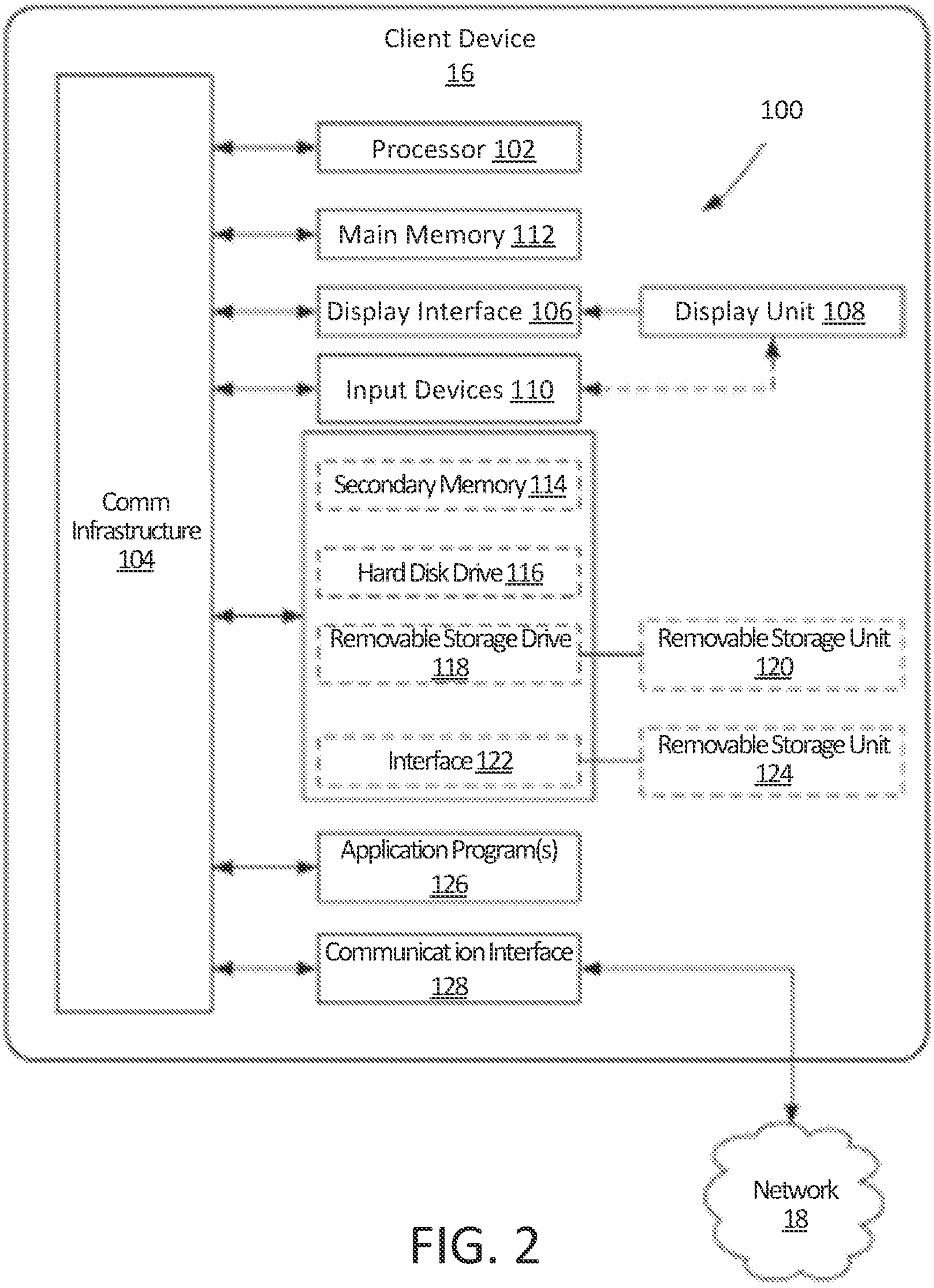
FIG. 2 is a schematic block diagram illustrating at least one embodiment of a client device configured as a mobile device consistent with the present disclosure.

FIG. 2 is a block diagram illustrating at least one embodiment of a client device 16 configured as a mobile device consistent with the present disclosure, although it should be noted that embodiments are not limited to mobile client devices. The mobile device 16 generally includes a computing system 100. As shown, the computing system 100 may include one or more processors 102, which can include, for example, at least one main processor (e.g., microprocessor, microcontroller, central processing unit, etc.) and optionally also at least one graphics processing unit (GPU) for performing any of various graphics-specific operations including, for example, producing tessellated graphics for display on display unit 108 (although in some embodiments the main processor may include a GPU and/or an extended instruction set of graphics instructions, or otherwise may perform graphics-specific operations such as in software). For convenience, the one or more processors are referred to herein collectively as "processor 102"). Processor 102 is operably connected to communication infrastructure 104 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 further includes a display interface 106 that forwards graphics, text, sounds, and other data from communication infrastructure 104 (or from a data buffer not shown) for display on display unit 108. The computing system further includes input devices 110. The input devices 110 may include one or more devices for interacting with the mobile device 16, such as a keypad, microphone, camera, as well as other input components, including motion sensors, and the like. In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 16, such as accessing and interacting with applications executed on the device 16.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the mobile device 16 may maintain one or more application programs, databases, media, and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 118 reads from and/or writes to removable storage unit 120 in any known manner. The removable storage unit 120 may represents a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task.

The computing system 100 further includes a communications interface 128. The communications interface 128 may be embodied as any communication circuit, device, or collection thereof, capable of enabling communications between the mobile device 16 external devices (other mobile devices 16, the cloud-based service 14, and the external computing system/server 22). The communications interface 128 may be configured to use any one or more communication technology and associated protocols, as described above, to effectuate such communication. For example, the communications interface 128 may be configured to communicate and exchange data with the server 12, the external computing system/server 22 and/or one other mobile device 16 via a wireless transmission protocol including, but not limited to, Bluetooth communication, infrared communication, near field communication (NFC), radio-frequency identification (RFID) communication, cellular network communication, versions of IEEE 802.11 transmission protocol standards, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 112 and/or secondary memory 114 or a local database on the mobile device 16. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100.

In one embodiment where the invention is implemented primarily in software, the software may be stored in a computer program product and loaded into the computing system 100 using removable storage drive 118, hard drive 116 or communications interface 128. The control logic (software), when executed by processor 102, causes processor 102 to perform the functions of the invention as described herein. In another embodiment, the invention may be implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention may be implemented using a combination of both hardware and software.

In order to provide the client device 16 with graphics rendering optimization settings automatically and in real-time, certain embodiments will include new components running on the server system 12 and on the client device 16. For convenience, the new component running on the server system is referred to herein for convenience as the Graphics Rendering Optimization Service (GROS), and the new component running on the client device 16 is referred to herein for convenience as the Graphics Rendering Optimization Client (GROC), which may be integrated into a client application such as a thin client application.

Figure 3:
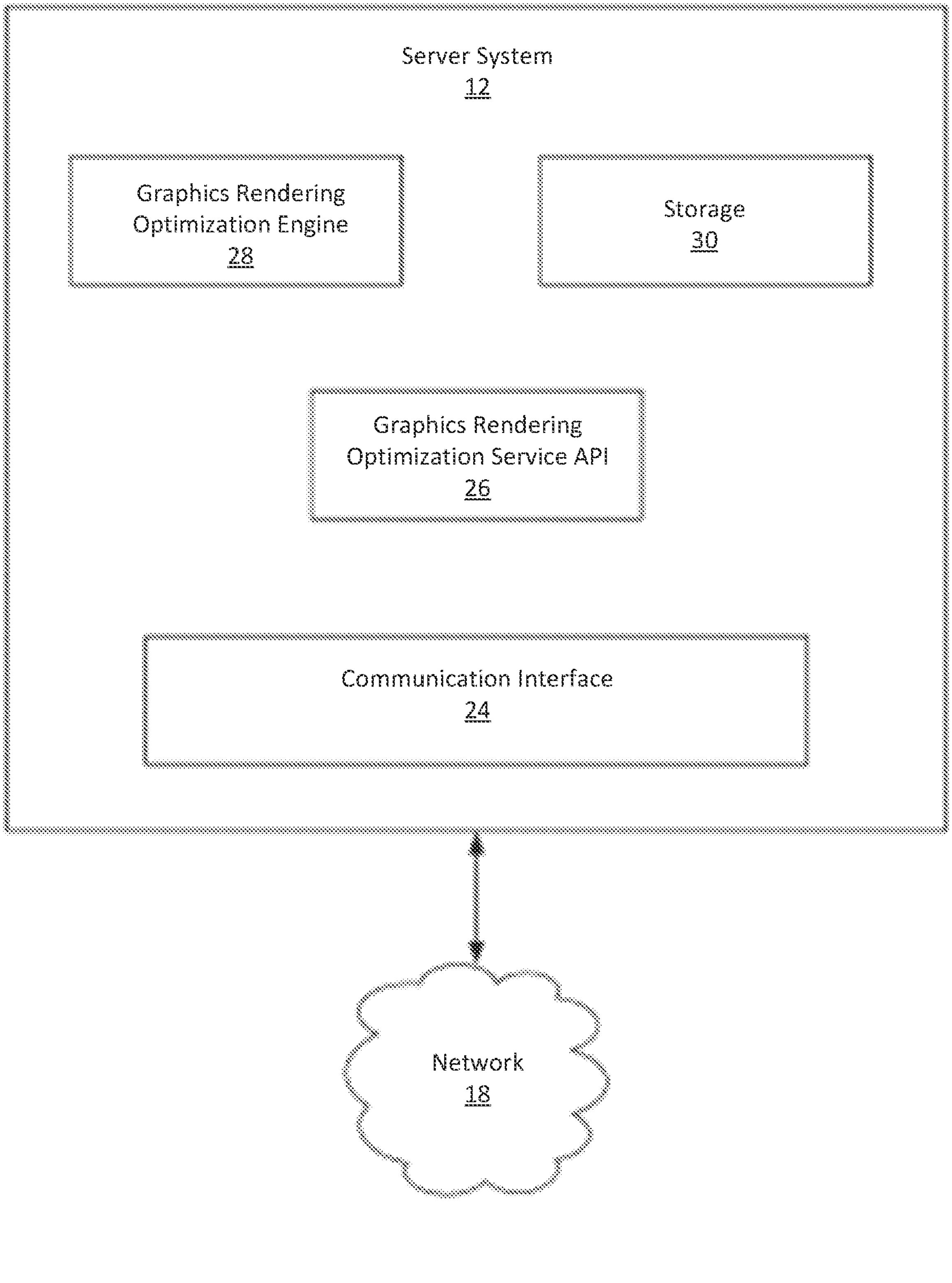
FIG. 3 is a schematic block diagram showing relevant components of a GROS server system, in accordance with certain embodiments.

As shown schematically in FIG. 3, in certain exemplary embodiments, the GROS preferably will include two different micro-services that preferably (but not necessarily) are deployed separately, namely a Graphics Rendering Optimization Service API 26 (which may be a Web API) and a Graphics Rendering Optimization Engine 28. Among other things, this separation, though not essential, allows these services to scale horizontally separately based on load on the server, and hence optimize server resources. In certain exemplary embodiments, the Graphics Rendering Optimization Service API 26 is implemented as a REST API based on OData standard, although other embodiments are possible. The Graphics Rendering Optimization Service API 26 communicates with the Graphics Rendering Optimization Engine 28 such as through gRPC messages. Thus, for example, the Graphics Rendering Optimization Engine 28 may include a gRPC service that listens to the requests from the Graphics Rendering Optimization Service API 26 and responds to such requests.

In certain embodiments, the Graphic Rendering Optimization Engine 28 employs an AI-based model that is trained and used to predict the graphics rendering settings in real time to improve the rendering performance. For example, certain embodiments prepare a Machine Learning (ML) model such as through supervised or semi-supervised learning techniques to provide an estimate for the correct rendering settings that can provide the best visual quality and performance for a given client application. Without limitation, a typical ML model is based on the following steps:

Step 1: Collection of Data

For this problem, the system gathers the parameters that define visualization performance as well as the parameters that can impact performance.

- Visualization performance parameters:
  - Model load time. This is the time taken to load the model in the given field of view and zoom level. Lower values indicate better performance.
  - Model quality. This is user perception on how the visual fidelity in the model looks like. It will be measured on a scale of 1 to 10, 1 being the worst and 10 being the best possible.
  - FramesPerSecond during navigation. This is measured as a number. More FPS is considered better for visualization performance.
  - Max GPU Usage. The GPU's sole purpose is to help in visualization. Hence, if some settings can consume more GPU, that generally implies less CPU usage or software rendering. Note that CPU usage is not being measured, as CPU usage generally will depend on what else is being run on the client at the same time and may widely vary.
- Input data (features) that can impact visualization performance:
  - Model graphic data. For each model, the following data will be measured:
    - Size—number of graphic objects in the model
    - Range of model—how far the graphic objects are spread out.
  - Network properties during the test. Network properties influencing the test will be measured:
    - Bandwidth available.
    - Jitter
    - Packet loss
    - Latency
  - GPU Type and max memory available
  - CPU Type and max processors and memory available
- Rendering Optimization Settings which can impact performance and which we are trying to control (the target or 'output' variables)
  - HTTPThreadCount: A larger number of threads can be used to parallelize the download of the graphics for the model. But this can benefit more when the network is slow and downloading model is the bottleneck in the visualization pipeline. Moreover, browsers limit the number of parallel downloads, hence a higher setting may not provide any benefit.
  - Worker Threads/pThreads: A larger number of worker threads can help tesselate faster if there is graphic data available to tesselate. But it will also consume higher CPU.
  - GPU Max: Max GPU that the renderer is allowed to consume before it must flush to the screen. We want to avoid frequent flushes, but we also want to leave some GPU for other applications.
  - LOD Schedule: We can control which graphic objects to display and how much accuracy should be used to display each object based on the distance from the camera. LOD schedule can impact performance by either getting unnecessary objects into the display queue or by displaying with too much accuracy when less accuracy would have been sufficient. On the contrary, it can impact visualization fidelity if the objects are removed too early or if they are rendered with less accuracy then required.

The above-mentioned data is collected for different models and different configurations. This can be done, for example, through a telemetry-based approach or generated by hand.

Step 2: Data Cleaning and Feature Engineering

Data is reviewed to clean up outliers and any other bad data and is rearranged. Data which should be labeled may need human interaction to determine the appropriate label for each data entry.

Step 3: Building Model, Selection of Correct ML Algorithm for Training the Model The building of a model starts with the algorithm used to generate the model. The problem that we are tackling here is a typical supervised learning regression problem. This is a multi-output regression problem, with the target output defined as the prediction of the following fields: LOD schedule, HTTPThreadCount, GPU Max, and worker thread/pthread count. Multiple algorithms will be tested when producing a model, the accuracy of the model will determine the best algorithm that suits the input data. Common algorithms for supervised learning include linear regression, support vector regression, nearest neighbors, decision trees and neural networks to name a few.

Step 4: Evaluating Model to Score and Compare Efficiency

Regression performance measurements are usually done using root mean squared error (RMSE) and mean absolute error (MAE). These metrics determine which model(s) to deploy.

Step 5: Deploying the Model

In certain embodiments, the chosen model is deployed as a live web service or other service accessible by the client application. Once the model is deployed, the rendering engine can look-up the optimized rendering settings for the given model, network, and CPU and GPU type in real time via a REST API call or other communication service, retrieve the predicted settings to meet desired criteria (better performance, better quality, etc.), and apply the predicated rendering settings.

Figure 4:
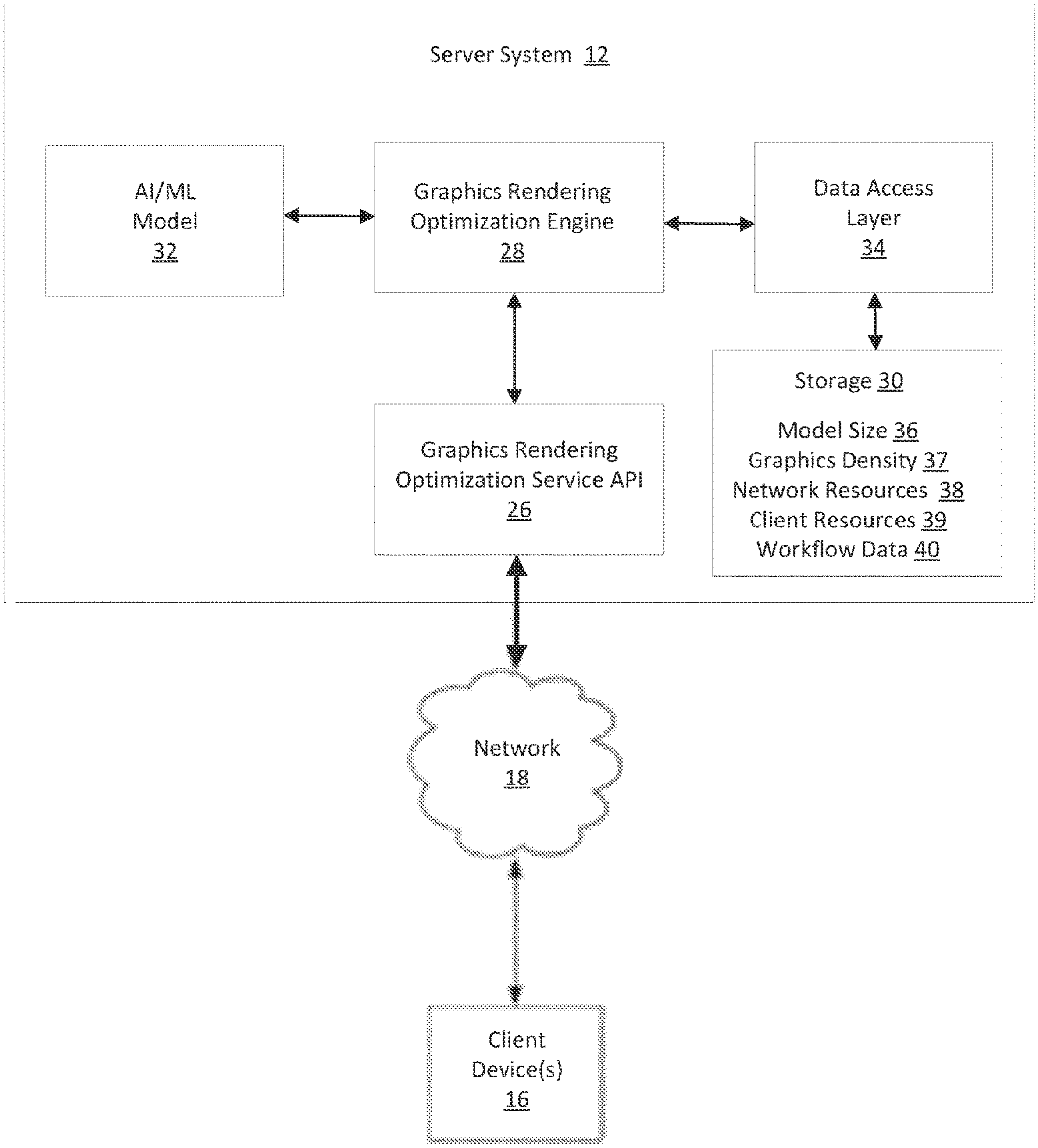
FIG. 4 is a schematic block diagram showing relevant components of a GROS in greater detail.

As shown schematically in FIG. 4, in certain exemplary embodiments, the GROS can include additional components such as the AI/ML model 32 and a Data Access Layer 34. The Data Access Layer (DAL) 34 may be configured to read data from the Storage 30 including such things as model size data 36, graphics density data 37, and client resources data 39 (some or all of which can be provided by the client application running in the client device) and network resources data 38 (e.g., which may be provided by the client application running in the client device or obtained from a network monitoring system—not shown for convenience). In certain exemplary embodiments, the client device 16 provides an identifier for a given graphics rendering optimization requests, and the Data Access Layer 34 retrieves the data from the Storage 30 based on the identifier (e.g., so that different graphics rendering optimization settings can be prepared and provided for different client application graphics rendering operations). The retrieved data is processed by the Graphic Rendering Optimization Engine 28 using the AI/ML model 32 to perform some of the processing for generating the graphics rendering optimization settings. It should be noted that multiple instances of the AI/ML model 32 may be executed by the server system 12, e.g., using multiple cloud containers. These graphics rendering optimization settings then may be converted into an optimal format for consumption/rendering by the client device 16 (e.g., a JSON or other format). Since the GROS is configured to handle multiple rendering settings requests simultaneously, the Graphics Rendering Optimization Engine 28 may maintain Workflow Data 40, e.g., to correlate a client request with graphic rendering optimization operations such as to support an asynchronous API.

Figure 5:
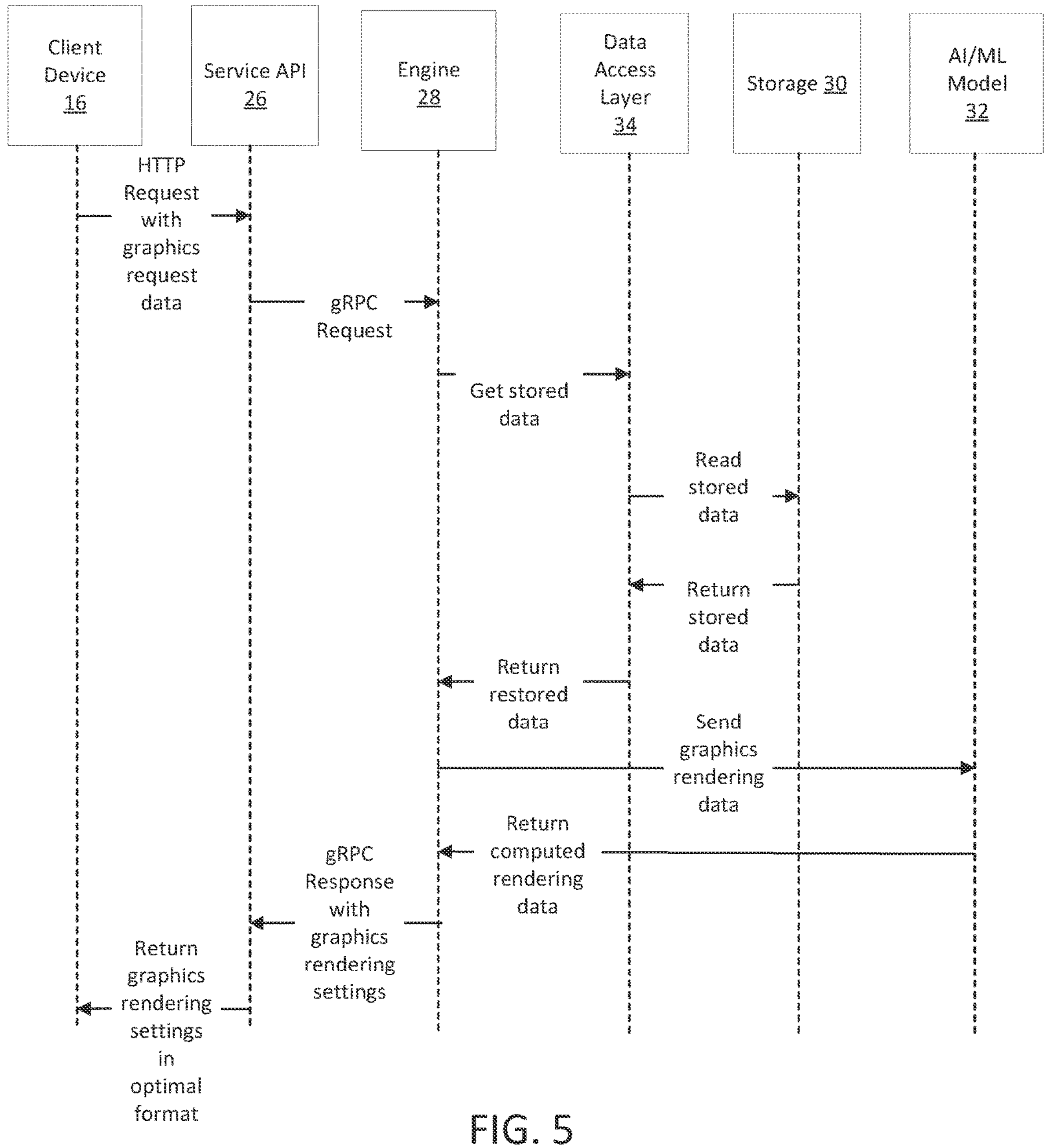
FIG. 5 is a schematic message flow diagram for graphic rendering optimization support, in accordance with certain embodiments.

More specifically, as shown schematically in FIG. 5, in certain exemplary embodiments, the client device 16 sends an HTTP request containing graphics request data to the Service API 26. The Service API 26 sends a corresponding gRPC request to the Engine 28. The Engine 28 feeds the AI/ML model 32 the current client settings and network values to produce a set of graphic rendering settings for the client device 16 and sends them via the Service API 26 to the client device 16, which then can render graphics based on the provided graphics rendering settings.

Thus, among other things, the GROC generally will be configured to perform the following operations:

1. Prepare a request (e.g., an HTTP request) with data needed for graphics rendering optimization such as model size data, graphics density data, client resources data (e.g., CPU and GPU resources), graphic rendering settings supported by the client, etc.
2. Transmit the HTTP request to the GROS.
3. Receive graphics rendering optimization settings from the GROS.
4. Apply the graphic rendering optimization settings for rendering of the graphics.

Among other things, the GROS generally will be configured to perform the following operations:

1. Receive a client request (e.g., an HTTP request) from the client via a Graphics Rendering Optimization Service API including data such as model size data, graphics density data, and client resources data (e.g., CPU and GPU resources).
2. Read data such as network resources data from storage (e.g., if not provided in the client request).
3. Generate graphics rendering optimization settings for the client by applying the AI/ML model to the received and retrieved data.
4. Convert the graphics rendering optimization settings to an optimal format that can be consumed by the client efficiently.
5. Prepare the response with the graphics rendering optimization settings and transmit the response to the client device 16 via the Graphics Rendering Optimization Service API.

Thus, the services deployed on the server prepare the graphics rendering optimization settings for the client, thus allowing the client device to get the settings without requiring significant resources on the client device. These services can further be scaled independently of the client, thus allowing it to be used on thin client applications to provide a high-performance service on thin client devices like browsers and mobile applications.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the EAM system 28, Coverage Map Module 32, Workflow Module 34, smartphone apps, etc.) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A graphics rendering optimization system comprising:

at least one processor coupled to at least one memory containing instructions which, when executed by the at least one processor, causes the system to implement a graphics rendering optimization client, wherein the graphics rendering optimization client is configured to perform processes comprising:

transmitting a client request for graphics rendering settings to a graphics rendering optimization server via an application program interface, the client request including model size data, graphics density data, client resources data, and client graphics rendering settings;

receiving, from the graphics rendering optimization server, via the application program interface, a message containing values for the client graphics rendering settings produced by the graphics rendering optimization server using a trained artificial intelligence/machine learning (AI/ML) model, wherein the values for the graphics rendering settings include at least one of Level of Detail (LOD) schedule, HTTPThreadCount, Graphics Processing Unit (GPU) Max, or worker thread/pthread count; and rendering graphics by the client device based on the values.

2. The system of claim 1, wherein the application program interface is a Representational State Transfer (REST) application program interface.

3. The system of claim 1, wherein the client request is an Hypertext Transfer Protocol (HTTP) request.

4. The system of claim 1, wherein the message is a JavaScript Object Notation (JSON) message.

5. The system of claim 1, wherein the values for the client graphics rendering settings include at least two of Level of Detail (LOD) schedule, HTTPThreadCount, Graphics Processing Unit (GPU) Max, or worker thread/pthread count.

6. The system of claim 1, wherein the client request further comprises network resources data.

7. The system of claim 1, wherein the graphics rendering optimization client is configured to run in a thin client application.

8. A graphics rendering optimization method comprising:

transmitting a client request for graphics rendering settings to a graphics rendering optimization server via an application program interface, the client request including model size data, graphics density data, client resources data, and client graphics rendering settings;

receiving, from the graphics rendering optimization server, via the application program interface, a message containing values for the client graphics rendering settings produced by the graphics rendering optimization server using a trained artificial intelligence/machine learning (AI/ML) model, wherein the values for the graphics rendering settings include at least one of Level of Detail (LOD) schedule, HTTPThreadCount, Graphics Processing Unit (GPU) Max, or worker thread/pthread count; and rendering graphics by the client device based on the values.

9. The method of claim 8, wherein the application program interface is a Representational State Transfer (REST) application program interface.

10. The method of claim 8, wherein the client request is an Hypertext Transfer Protocol (HTTP) request.

11. The method of claim 8, wherein the message is a JavaScript Object Notation (JSON) message.

12. The method of claim 8, wherein the values for the client graphics rendering settings include at least two of Level of Detail (LOD) schedule, HTTPThreadCount, Graphics Processing Unit (GPU) Max, or worker thread/pthread count.

13. The method of claim 8, wherein the client request further comprises network resources data.

14. The method of claim 8, wherein the graphics rendering optimization client is configured to run in a thin client application.

15. A computer program product comprising at least one tangible, non- transitory computer-readable storage medium having embodied therein computer program instructions which, when executed by one or more processors of a system, cause the system to implement a graphics rendering optimization client, wherein the graphics rendering optimization client is configured to perform processes comprising:

transmitting a client request for precision geometry to a graphics rendering optimization server via an application program interface, the client request including model size data, graphics density data, client resources data, and client graphics rendering settings;

receiving, from the graphics rendering optimization server, via the application program interface, a message containing values for the client graphics rendering settings produced by the graphics rendering optimization server using a trained artificial intelligence/machine learning (AI/ML) model, wherein the values for the graphics rendering settings include at least one of Level of Detail (LOD) schedule, HTTPThreadCount, Graphics Processing Unit (GPU) Max, or worker thread/pthread count; and rendering graphics by the client device based on the values.

16. The computer program product of claim 15, wherein the application program interface is a Representational State Transfer (REST) application program interface.

17. The computer program product of claim 15, wherein the client request is an Hypertext Transfer Protocol (HTTP) request.

18. The computer program product of claim 15, wherein the message is a JavaScript Object Notation (JSON) message.

19. The computer program product of claim 15, wherein the values for the client graphics rendering settings include at least two of Level of Detail (LOD) schedule, HTTPThreadCount, Graphics Processing Unit (GPU) Max, or worker thread/pthread count.

20. The computer program product of claim 15, wherein the client request further comprises network resources data.

21. The computer program product of claim 15, wherein the graphics rendering optimization client is configured to run in a thin client application.

* * * * *